(12) United States Patent
Lien et al.

(10) Patent No.: US 11,874,463 B2
(45) Date of Patent: Jan. 16, 2024

(54) WAVEGUIDE COMBINER WITH AT LEAST ONE EMBEDDED FILM LAYER

(71) Applicant: HIMAX TECHNOLOGIES LIMITED, Tainan (TW)

(72) Inventors: Jiun-Yi Lien, Tainan (TW); Chien-Feng Hung, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 119 days.

(21) Appl. No.: 17/393,419

(22) Filed: Aug. 4, 2021

(65) Prior Publication Data

US 2023/0044369 A1 Feb. 9, 2023

(51) Int. Cl.
*G02B 27/01* (2006.01)
*F21V 8/00* (2006.01)

(52) U.S. Cl.
CPC ....... *G02B 27/0101* (2013.01); *G02B 6/0025* (2013.01); *G02B 6/0031* (2013.01); *G02B 27/0172* (2013.01); *G02B 6/0011* (2013.01); *G02B 2027/0118* (2013.01)

(58) Field of Classification Search
CPC ............... G02B 6/0025; G02B 6/0031; G02B 27/0101; G02B 27/0118
See application file for complete search history.

(56) References Cited

U.S. PATENT DOCUMENTS

| | | | | |
|---|---|---|---|---|
| 8,654,420 | B2 * | 2/2014 | Simmonds | G02B 5/0833 359/13 |
| 10,437,064 | B2 * | 10/2019 | Popovich | G02B 6/0016 |
| 11,307,432 | B2 * | 4/2022 | Popovich | G02B 6/0016 |
| 11,320,571 | B2 * | 5/2022 | Brown | G02B 6/0076 |
| 11,480,788 | B2 * | 10/2022 | Popovich | G02F 1/29 |
| 11,513,350 | B2 * | 11/2022 | Waldern | G02B 27/0081 |
| 2012/0062998 | A1 * | 3/2012 | Schultz | B29D 11/00663 156/60 |
| 2019/0187472 | A1 * | 6/2019 | Choi | G02B 27/0905 |
| 2022/0035075 | A1 * | 2/2022 | Rao | C09D 7/41 |

FOREIGN PATENT DOCUMENTS

CN  110596807 A  * 12/2019  ......... G02B 27/0172

* cited by examiner

*Primary Examiner* — Daniel Petkovsek
(74) *Attorney, Agent, or Firm* — Winston Hsu

(57) ABSTRACT

A waveguide combiner includes an in-coupling area, a waveguide body, an out-coupling area and at least one film layer. The in-coupling area is configured to introduce a light beam. The waveguide body is configured to guide the light beam introduced by the in-coupling area. The out-coupling area is configured to output the light beam guided by the waveguide body. Said at least one film layer is embedded in at least one portion of the in-coupling area, the waveguide body and the out-coupling area. Said at least one film layer is configured to divide said at least one portion of the in-coupling area, the waveguide body and the out-coupling area into a plurality of layers, and the light beam is reflected by said at least one film layer or penetrates said at least one film layer between different layers of the plurality of layers.

11 Claims, 4 Drawing Sheets

WAVEGUIDE COMBINER WITH AT LEAST ONE EMBEDDED FILM LAYER

BACKGROUND OF THE INVENTION

1. Field of the Invention

The present invention is related to a waveguide combiner, and more particularly, to a waveguide combiner with at least one embedded film layer.

2. Description of the Prior Art

In augmented-reality (AR) applications, a waveguide combiner is the most advanced component to combine see-through images and artificial images. The total internal reflection (TIR) of the waveguide combiner is used to guide the light beams projected by the light engine to the transparent light output area and project to the user's eye by exit-pupil expansion (pupil replication). This technology has the advantages of small size, light weight, large eye box, and wide field of view (FoV). Waveguide combiners can be sorted into geometrical optical waveguides (reflective waveguides) and diffractive waveguides, where the reflective waveguides have higher brightness and good color uniformity. Please refer to FIG. 1. FIG. 1 is a diagram illustrating a waveguide combiner 10 of prior art. As shown in FIG. 1, the waveguide combiner 10 comprises an in-coupling area 12, a waveguide body 14 and an out-coupling area 16. The in-coupling area 12 is configured to introduce a light beam 18. The waveguide body 14 is configured to guide the light beam 18. The out-coupling area 16 is configured to output the light beam 18. The light beam 18 is guided in the waveguide body 14 and undergoes an operation of exit-pupil expansion on the out-coupling area 16, such that two output light beams 19 are output from a position A and a position B. An angle at which the light beam 18 enters the in-coupling area 12 is the same as an angle at which the output light beam 19 exits from the out-coupling area 16.

However, the geometric optical waveguide is difficult to improve the brightness uniformity through a gradual structure within the diffractive optical waveguide due to large structural size (for millimeter (mm) level in general). Furthermore, a larger projector is generally required. If the size of the light engine is reduced, the beam width is going small, such that the pupil replication cannot overlap each other, and some dark lines are generated in the artificial image, and more particularly, when the FoV of the artificial image is increased, the image brightness is difficult to be uniform.

SUMMARY OF THE INVENTION

It is therefore an objective of the present invention to provide a waveguide combiner for having improved brightness uniformity, where the waveguide combiner comprises at least one film layer embedded therein.

At least one embodiment of the present invention provides a waveguide combiner comprising an in-coupling area, a waveguide body, an out-coupling area and at least one film layer. The in-coupling area is configured to introduce a light beam. The waveguide body is configured to guide the light beam introduced by the in-coupling area. The out-coupling area is configured to output the light beam guided by the waveguide body. Said at least one film layer is embedded in at least one portion of the in-coupling area, the waveguide body and the out-coupling area. Said at least one film layer is configured to divide said at least one portion of the in-coupling area, the waveguide body and the out-coupling area into a plurality of layers, and the light beam is reflected by said at least one film layer or penetrates said at least one film layer between different layers of the plurality of layers.

The waveguide combiner with film layer (s) that is proposed by the present invention may introduce more light beams and increase the reflection path of light beams. For example, the waveguide combiner is divided into a plurality of layer by the film layer (s), such that the reflection paths of the light beams are increased because of the light beams being reflected more. Through increasing the reflection path of the light beams guided in the waveguide combiner, the output light beams have improved brightness uniformity.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
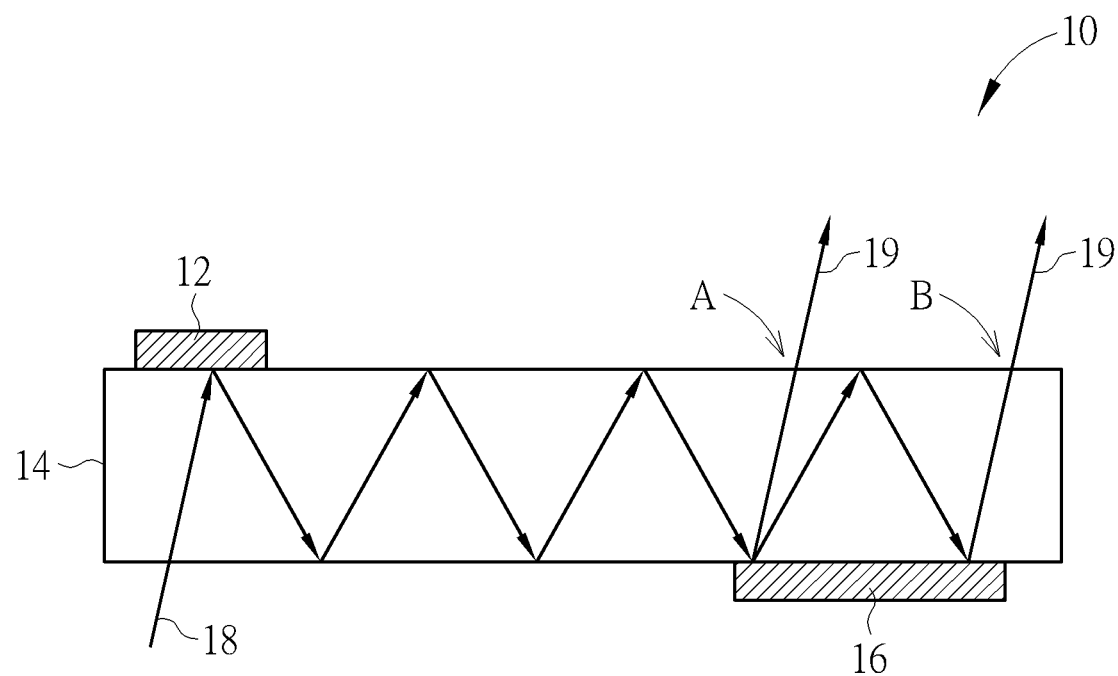
FIG. 1 is a diagram illustrating a waveguide combiner of prior art.
Figure 2:
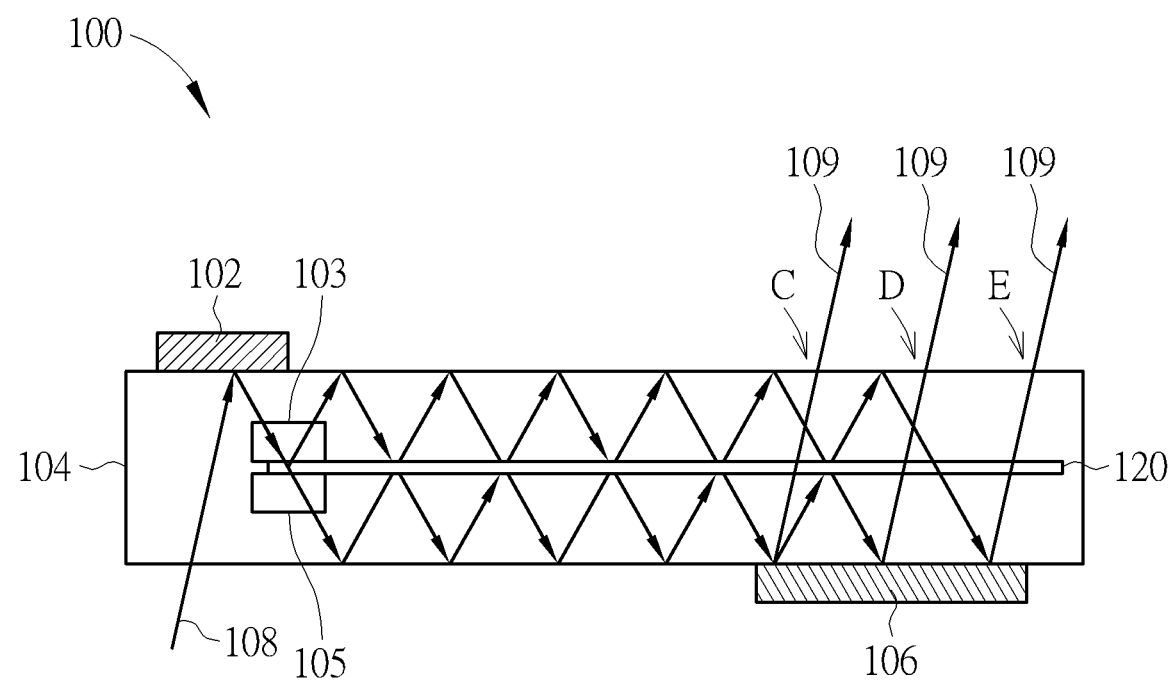
FIG. 2 is a diagram of a waveguide combiner according to a first embodiment of the present invention.

Please refer to FIG. 2. FIG. 2 is a diagram of a waveguide combiner 100 according to a first embodiment of the present invention. As shown in FIG. 2, the waveguide combiner 100 of the first embodiment comprises an in-coupling area 102, a waveguide body 104, an out-coupling area 106 and at least one film layer 120. The in-coupling area 102 is configured to introduce a light beam 108. The waveguide body 104 is configured to guide the light beam 108 introduced by the in-coupling area 102 through, for example, total internal reflection. The out-coupling area 106 is configured to output the light beam 108 guided by the waveguide body 104. Said at least one film layer 120 is embedded in at least one portion (i.e. part or all) of the in-coupling area 102, the waveguide body 104 and the out-coupling area 106. For example, said at least one film layer 120 may be embedded in the in-coupling area 102, the waveguide body 104, the out-coupling area 106, or a combination thereof. More specifically, said at least one film layer 120 may be embedded in only one of the in-coupling area 102, the waveguide body 104 and the out-coupling area 106, or embedded in only two of the in-coupling area 102, the waveguide body 104 and the out-coupling area 106, or embedded in all of the in-coupling area 102, the waveguide body 104 and the out-coupling area 106. Said at least one film layer 120 is configured to divide said at least one portion (i.e. part or all) of the in-coupling area 102, the waveguide body 104 and the out-coupling area 106 into a plurality of layers such as an upper layer and a lower layer, and the light beam 108 is reflected by said at least one film layer 120 or penetrates said at least one film layer 120 between different layers of the plurality of layers. In addition, the waveguide body 104 may further include at least one beam-folding zone 103 overlapping said at least one film layer 120 and at least one beam-expanding zone 105 overlapping said at least one film layer 120.

In the present embodiment, said at least one film layer 120 is one semi-reflective film layer embedded in the waveguide body 104 overlapping the out-coupling area 106. When the light beam 108 is incident on the semi-reflective film layer 120, the light beam 108 is allowed to be reflected to be guided in one layer of the waveguide body 104, or is allowed to penetrate the semi-reflective film layer 120 and reach another layer of the waveguide body 104. Through passing and reflecting the light beam 108 between different layers, the reflection paths of the light beams are increased, such that the light beam 108 undergoes an operation of exit-pupil expansion on the out-coupling area 106. In other words, three output light beams 109 are output from a position C, a position D and a position E. It should be noticed that an angle at which the light beam 108 enters the in-coupling area 102 is the same as an angle at which the output light beam 109 exits from the out-coupling area 106. In some embodiments, said at least one film layer 120 can be one reflective film layer located in the waveguide body 104, for allowing the light beam 108 to be guided in one layer of the waveguide body 104, such that the reflection paths of the light beams may be increased as well. Furthermore, in some other embodiment, said at least one film layer 120 can be a patterned film layer, such as a patterned reflective film layer or a patterned semi-reflective film layer, configured to pass the light beam in a specific area of the waveguide body 104.

According to above arrangement, said at least one film layer 120 may reflect the light beam introduced by the in-coupling area 102 or pass the light beam to a different layer, such that the reflection paths of the light beams may be increased. Through increasing the reflection path of the light beams guided in the waveguide combiner, the output light beams have improved brightness uniformity.

Figure 3:
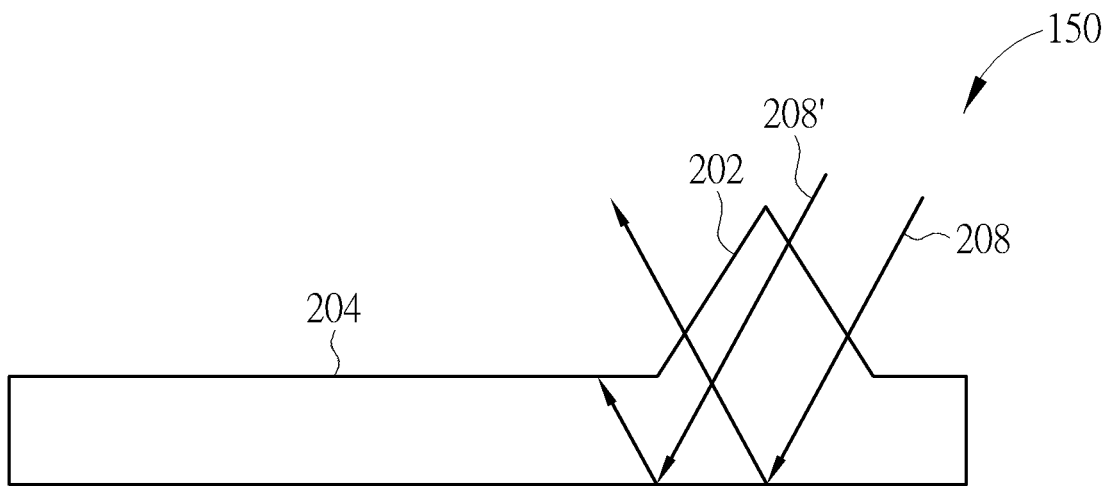
FIG. 3 is a diagram of a waveguide combiner with an in-coupling area comprising a prism structure.
Figure 4:
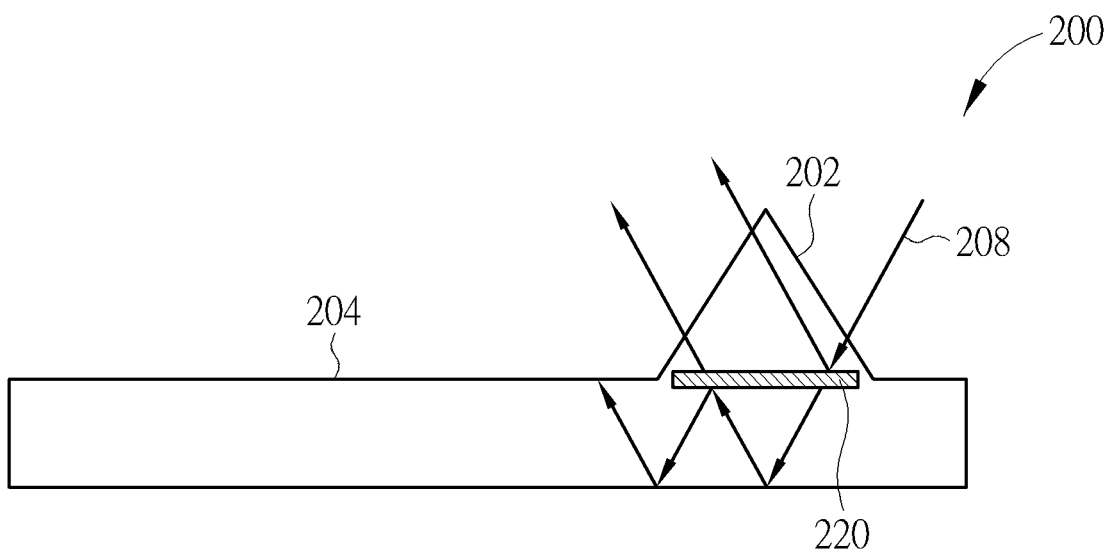
FIG. 4 is a diagram of a waveguide combiner with at least one film layer according to a second embodiment of the present invention.

Please refer to FIG. 3 in conjunction with FIG. 4. FIG. 3 is a diagram of a waveguide combiner 150 with an in-coupling area 202 comprising a prism structure. FIG. 4 is a diagram of a waveguide combiner 200 with at least one film layer according to a second embodiment of the present invention. As shown in FIG. 3, the waveguide combiner 150 comprises an in-coupling area 202 and a waveguide body 204. The out-coupling area is omitted in FIG. 3 and FIG. 4 for simplicity. The in-coupling area 202 has a prism structure with a light beam entering side. Two light beams 208, 208' are projected to the light beam entering side of the prism structure. The light beam 208' is reflected and guided in the waveguide body 204, but the light beam 208 is reflected to be output from the prism structure because of the incident angle and position of the light beam 208. As shown in FIG. 4, the waveguide combiner 200 of the second embodiment of the present invention comprises the in-coupling area 202 having the prism structure, the waveguide body 204 and at least one film layer. For example, said at least one film layer may be a semi-reflective film layer 220 embedded in the in-coupling area 202. When the light beam 208 enters into the prism structure of the in-coupling area 202, a portion of the light beam 208 penetrates the semi-reflective film layer 220 and a portion of the light beam 208 is reflected to be output from the prism structure. The portion of the light beam 208 not being reflected is allowed to penetrate the semi-reflective film layer 202, such that the portion of the light beam 208 may be guided in the waveguide body 204. Since more light beams may be introduced in the waveguide body 204, the brightness uniformity of the waveguide combiner 200 may be improved.

Figure 5:
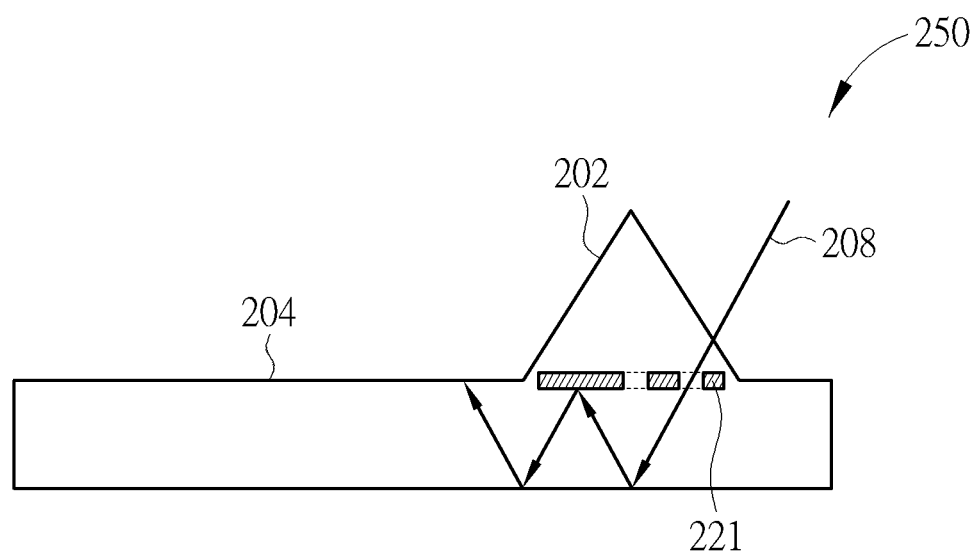
FIG. 5 is a diagram of a waveguide combiner with another film layer according to the second embodiment of the present invention.

The film layer embedded in the prism structure may vary, depending upon actual design considerations. Please refer to FIG. 5. FIG. 5 is a diagram of a waveguide combiner 250 with another film layer according to the second embodiment of the present invention. As shown in FIG. 5, the waveguide combiner 250 of the second embodiment of the present invention comprises the in-coupling area 202 having the prism structure, the waveguide body 204 and at least one film layer. For example, said at least one film layer may be a patterned reflective film layer 221 embedded in the in-coupling area 202. The patterned reflective film layer 221 is configured to pass the light beam 208 in a specific area in the prism structure. The light beam 208 may pass through the specific area of the patterned reflective film layer 221, and then be reflected to be guided in the waveguide body 204. Through the specific area of the patterned reflective film layer 221 introducing more light beams, the brightness uniformity of the waveguide combiner 250 may be improved.

Figure 6:
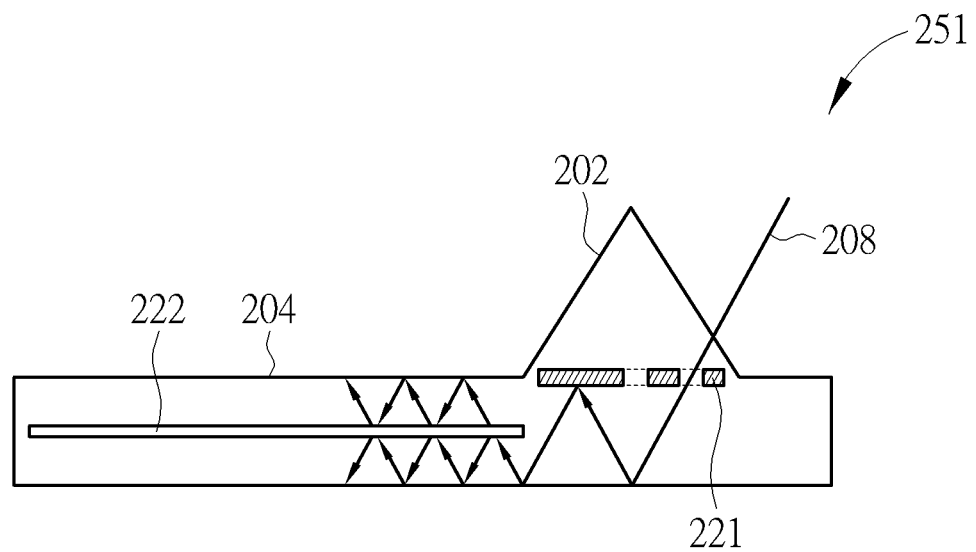
FIG. 6 is a diagram of a waveguide combiner with two film layers according to the second embodiment of the present invention.

More film layers may be added to the waveguide combiner of the second embodiment. Please refer to FIG. 6. FIG. 6 is a diagram of a waveguide combiner 251 with two film layers according to the second embodiment of the present invention. As shown in FIG. 6, similarly, the waveguide combiner 250 of the second embodiment of the present invention comprises the in-coupling area 202 having the prism structure, the waveguide body 204 and at least one film layer. For example, said at least one film layer may be two film layers comprising a patterned reflective film layer 221 embedded in the in-coupling area 202 and a semi-reflective film layer 222 embedded in the waveguide body 204. The semi-reflective film layer 222 is configured to increase the reflection path of the light beams guided in the waveguide combiner 251. The light beam 208 is introduced in the in-coupling area 202 through the specific area of the patterned reflective film layer 221 and reflected by the reflective film layer 221 and the semi-reflective film layer 222 to be guided. Since operations of the semi-reflective film layer and the out-coupling area are similar to that of the waveguide combiner of the first embodiment, further description is omitted here for simplicity. Through the specific area of the patterned reflective film layer 221 introducing more light beams and the semi-reflective film layer 222 increasing the reflection path of the light beams, the brightness uniformity of the waveguide combiner 251 may be improved.

The waveguide combiner with film layer(s) that is proposed by the present invention may introduce more light beams and increase the reflection path of light beams. For example, the proposed waveguide combiner is divided into a plurality of layers by the film layer(s), such that the reflection paths of the light beams are increased because of the light beams being reflected more. Through increasing the reflection path of the light beams guided in the waveguide combiner, the output light beams have improved brightness uniformity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A waveguide combiner, comprising:
an in-coupling area, configured to introduce a light beam;
a waveguide body, configured to guide the light beam introduced by the in-coupling area;
an out-coupling area, configured to output the light beam guided by the waveguide body; and
a first film layer, embedded in the waveguide body, wherein the first film layer is configured to divide the waveguide body into a plurality of layers, and the light beam is reflected by the first film layer or penetrates the first film layer between different layers of the plurality of layers;
wherein the waveguide combiner further comprises a second film layer, the second film layer is different from the first film layer, the in-coupling area is coupled to a surface of the waveguide body, and comprises a prism structure; and the second film layer is embedded in an interface between the prism structure and the waveguide body.

2. The waveguide combiner of claim 1, wherein the first film layer is a reflective film layer, for allowing the light beam to be guided in one layer of the waveguide body.

3. The waveguide combiner of claim 2, wherein the reflective film layer is a patterned film layer configured to pass the light beam in a specific area of the waveguide body.

4. The waveguide combiner of claim 1, wherein the first film layer comprises a semi-reflective film layer, for allowing the light beam to be guided in one layer of the waveguide body or allowing the light beam to penetrate the semi-reflective film layer and reach another layer of the waveguide body.

5. The waveguide combiner of claim 4, wherein the semi-reflective film layer is a patterned film layer configured to pass the light beam in a specific area of the waveguide body.

6. The waveguide combiner of claim 1, wherein the second film layer is a semi-reflective film layer for allowing the light beam to penetrate the semi-reflective film layer and reach the waveguide combiner or allowing the light beam to be reflected in the prism structure.

7. The waveguide combiner of claim 6, wherein the first film layer is a reflective film layer, for allowing the light beam to be guided in one layer of the waveguide body.

8. The waveguide combiner of claim 6, wherein the first film layer is a semi-reflective film layer, for allowing the light beam to be guided in one layer of the waveguide body or allowing the light beam to penetrate the semi-reflective film layer and reach another layer of the waveguide body.

9. The waveguide combiner of claim 1, wherein the second film layer is a patterned reflective film layer for passing the light beam in a specific area in the prism structure.

10. The waveguide combiner of claim 9, wherein the first film layer is a reflective film layer, for allowing the light beam to be guided in one layer of the waveguide body.

11. The waveguide combiner of claim 9, wherein the first film layer is a semi-reflective film layer, for allowing the light beam to be guided in one layer of the waveguide body or allowing the light beam to penetrate the semi-reflective film layer and reach another layer of the waveguide body.

* * * * *